United States Patent [19]
Protz, Jr.

[11] Patent Number: 5,605,314
[45] Date of Patent: Feb. 25, 1997

[54] STAKING SYSTEM FOR SECURING BLOW MOLDED FIGURES

[75] Inventor: William F. Protz, Jr., Lake Forest, Ill.

[73] Assignee: Santa's Best, Northfield, Ill.

[21] Appl. No.: 386,095

[22] Filed: Feb. 9, 1995

[51] Int. Cl.$^6$ ............................................. A47B 97/00
[52] U.S. Cl. ........................... 248/508; 248/545; 411/483; 446/268
[58] Field of Search ....................... 248/508, 500, 248/545, 509, 156, 346.04, 546; 446/268; 411/441, 483, 485, 923

[56] References Cited

U.S. PATENT DOCUMENTS

| | | | |
|---|---|---|---|
| 1,596,231 | 8/1926 | Bennett | 248/156 |
| 2,140,862 | 12/1938 | Sumner | 248/154 X |
| 3,310,266 | 3/1967 | Larken et al. | 248/508 X |
| 3,809,346 | 5/1974 | Jackson | 248/156 X |
| 4,402,166 | 9/1983 | Wortham, Jr. | 248/156 X |
| 4,429,849 | 2/1984 | Maier | 248/156 |
| 4,441,679 | 4/1984 | Calet | 248/156 |
| 5,054,579 | 10/1991 | Mason | 248/508 X |
| 5,378,187 | 1/1995 | Forbes et al. | 248/500 X |

Primary Examiner—Korie Chan
Attorney, Agent, or Firm—Emrich & Dithmar

[57] ABSTRACT

A staking system which may be combined with a blow molded figure having a flange at the base, includes at least two stakes each having a first elongated portion terminating in a first bend leading to a second portion and a second bend leading to a third portion, and at least one additional stake having an engagement portion at one end thereof for contacting the outside of the blow molded figure. At least two stakes driven into the ground have either the second portions or third portions in contact with the flange. The additional stake has the engagement portion thereof in contact with the blow molded figure to provide at least three angularly separated points of contact between the blow molded figure and the stakes. The angle defined by the first bend is less than about 60° and the angle defined by the second bend is less than about 30°.

17 Claims, 1 Drawing Sheet

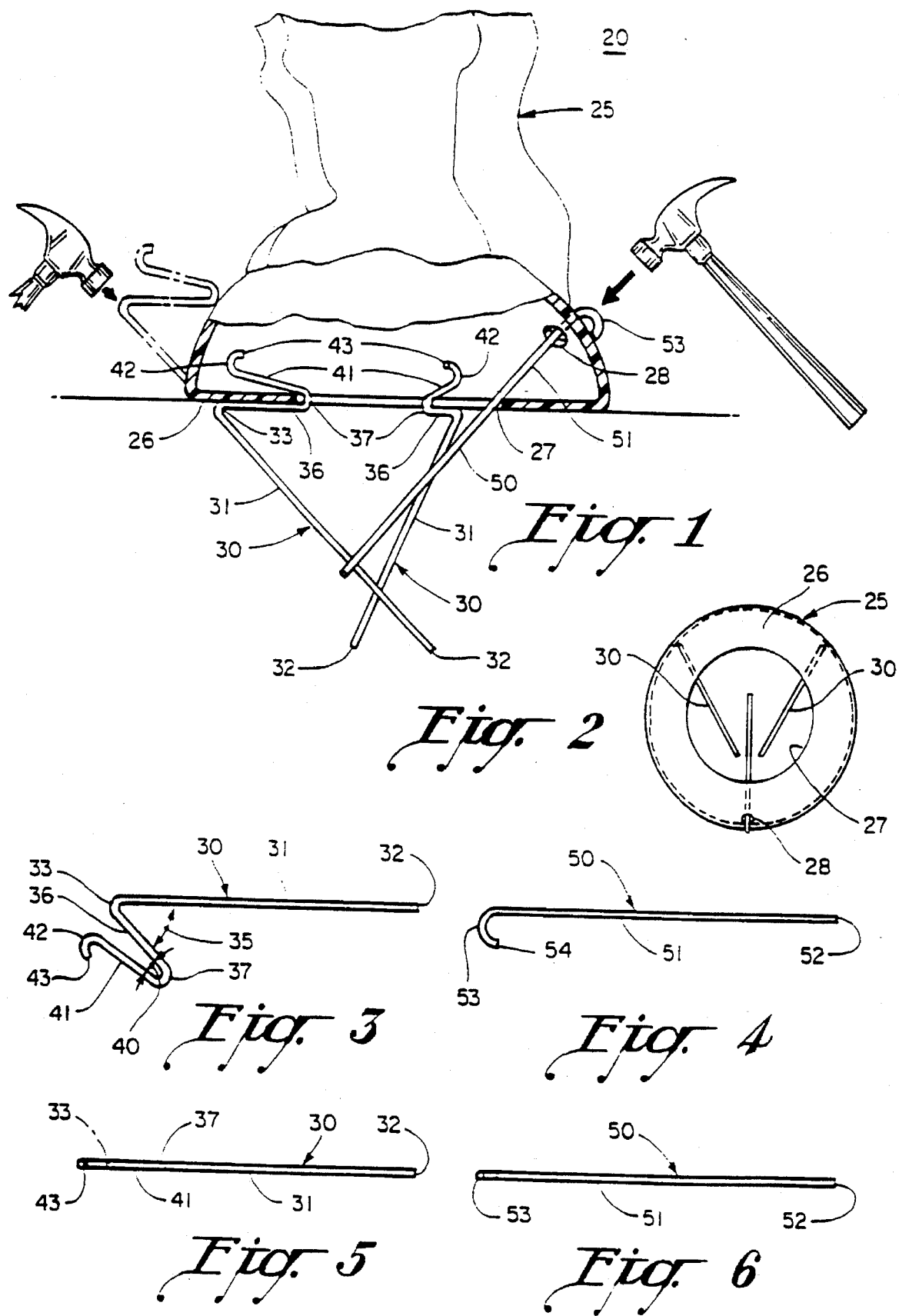

5,605,314

STAKING SYSTEM FOR SECURING BLOW MOLDED FIGURES

BACKGROUND OF THE INVENTION

This invention relates to the combination of a blow molded figure of the type normally staked to the ground in front of a residence and a staking system therefor. Blow molded figures are frequently used at Christmas time, Easter and at Halloween, although they may be used for other occasions as well. Typically, blow molded figures are light weight and have a tendency easily to be blown about by the wind. Generally, some method must be employed by which weights or other means are used to prevent the blow molded figures from being moved about. Usually, these methods involve the use of bricks or other heavy weights which are piled around the blow molded figure or if the blow molded figure has a flange at the bottom thereof, on the top of the flange. Also typically, these systems are not very satisfactory for a variety of reasons.

SUMMARY OF THE INVENTION

Accordingly, it is an object of the present invention to provide a staking system for use with blow molded figures which is easy to install, inexpensive and efficient in retaining the blow molded figures in their desired position.

Yet another object is to provide a combination of a blow molded figure and the staking system referred to above which can be sold as a unit at retail to enable purchasers of the blow molded figures to be secure that the figures will not be blow away.

Yet another object of the invention is to provide a combination of the type set forth which secures the blow molded figure from being moved about by wind coming at the figure at any direction.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

FIG. 1 is a front view partly in section of a blow molded figure with the staking system in place;

FIG. 3 is a bottom view of the combination illustrated in FIG. 1;

FIG. 3 is a side elevational view of one type of stake used in the staking system employed with the combination of the invention;

FIG. 4 is a side elevational view of another stake used with the combination of the invention;

FIG. 5 is a front view of the stake illustrated in FIG. 3; and

FIG. 6 is a front view of the stake illustrated in FIG. 4.

DETAILED DESCRIPTION OF THE PREFERRED EMBODIMENT

Referring now to the drawings, there is disclosed a combination 20 of a blow molded FIG. 25 and a staking system which includes two stakes 30 and a stake 50. The blow molded FIG. 25 may be in the form of any suitable holiday figure such as Santa, Mrs. Santa, reindeer, elves or dwarfs for Christmas or bunnies for Easter or various ghostly creatures for Halloween. The blow molded FIG. 25 has an inwardly extending flange 26 defining a large central opening 27 at the bottom thereof and is provided with a small aperture 28 in the side wall of the blow molded figure 25 near the bottom.

Stake 30 is preferably metal and has an elongated first portion 31 ending in a tip 32 which may be sharpened for insertion into the ground and a bend 33 at the other end. The bend 33 interconnects the elongated first portion 31 with a second portion 36 and forms an angle 35 therebetween. The second portion 36 extends to a bend 37 which connects the second portion 36 with a third portion 41 and forms an angle 40 therebetween. The third portion 41 terminates in a bend 42 which leads to a distal end 43 of the stake 30. Preferably, the angle 35 does not exceed about 60° and the angle is not greater than about 45°. The angle 40 is between about 10° and 30° with about 20° being preferred.

The other stake 50 includes an elongated portion 51 terminating at an end 52 which may or may not be sharpened and a bend 53 at the other end having a distal end 54. In use, at least two stakes 30 are driven into the ground such that they contact an inwardly extending flange 26 in the manner illustrated with the stakes 30 being angularly spaced away from each other a sufficient amount to provide stability to the blow molded FIG. 25. It is suggested that the two stakes 30 be approximately 90°–120° apart, but the exact angular distance separating the two stakes 30 is a matter of choice. The flange 26 is inserted between the second portion 36 and the third portion 41 of the stakes 30. The stake 50 is inserted through aperture 28 and is driven into the ground by a hammer as illustrated in FIG. 1 so that all stakes are firmly driven into ground with the stakes 30 contacting the blow molded figure internally thereof while the stake 50 contacts the blow molded FIG. 25 exteriorly thereof. It is clear that the stake 50 must be driven in last.

It is also possible that the blow molded FIG. 25 may have an outwardly extending flange 26 rather than the inwardly extending flange illustrated. Such a case, the flange 26 extending outwardly of the FIG. 25 would then be contacted by the second portion 36 of the stakes 30 so as to trap the flange between the second portion 36 and the ground. The use of the stake 50 would remain substantially the same although if the flange 26 extended outwardly, three stakes 30 could easily be used rather than a combination as illustrated in FIG. 1 and no aperture 28 would needed to accommodate state 50 to maintain blow molded FIGS. 25 in place.

The foregoing combination of blow molded FIG. 25 and staking system 30 and 50 provides an inexpensive yet trustworthy system for addressing the problem of maintaining blow molded FIGS. 25 in place during inclement weather. As seen from the illustrations, the stakes 30 and 50 should be driven into the ground at acute angles in order to provide a stabilized system for retaining the blow molded FIG. 25 in place.

While there has been disclosed what is considered to be the preferred embodiment of the present invention, it is understood that various changes in the details may be made without departing from the spirit, or sacrificing any of the advantages of the present invention.

I claim:

1. A staking system for a blow molded figure having a flange at the base thereof, comprising at least two stakes each having a first elongated portion terminating in a first bend of less than about 60° leading to a second portion and an upper portion connected to the second portion, said upper portion extends over and above the second portion for retaining the base of the blow molded figure, and at least one additional stake having an engagement portion at one end thereof for contacting the outside of the blow molded figure, whereby said at least two stakes driven into the ground have the second portions thereof for contacting with the flange on the blow molded figure and said additional stake has the engagement portion thereof for contacting with the blow molded figure to provide at least three angularly separated points of contact between the blow molded figure and said stakes.

2. The staking system of claim 1, wherein said at least two stakes each have the second portion thereof terminating in a second bend leading to a third portion which defines said upper portion.

3. The staking system of claim 2, wherein said first bend is not greater than about 45° and said second bend is not greater than about 20°.

4. The staking system of claim 2, wherein said second portion is adapted to be positioned between the ground and the flange on the blow molded figure.

5. The staking system of claim 4, wherein said second portion is adapted to be positioned between the ground and the flange and said third portion overlies the flange.

6. The staking system of claim 5, wherein said at least two stakes and said additional stake are driven to the ground at an acute angle to prevent the blow molded figure from being blown away by wind.

7. The staking system of claim 6, wherein all portions of each stake lie in a single plane.

8. A combination comprising a blow molded figure having a flange at a base thereof and a staking system for said blow molded figure, said staking system including at least two stakes each having a first elongated portion terminating in a first bend of less than about 60° leading to a second portion and an upper portion connected to the second portion, said upper portion extends over and above the second portion for retaining the base of the blow molded figure, and at least one additional stake having an engagement portion at one end thereof for contacting the outside of said blow molded figure, whereby said at least two stakes driven into the ground have the second portions thereof in contact with said flange on said blow molded figure and said additional stake has said engagement portion thereof in contact with said blow molded figure to provide at least three angularly separated points of contact between said blow molded figure and said stakes.

9. The combination of claim 8, wherein said at least two stakes each have said second portion thereof terminating in a second bend leading to a third portion which defines said upper portion.

10. The combination of claim 9, wherein said second portion is positioned between the ground and the flange and the third portion overlies the flange, said additional stake extends through an aperture in the blow molded figure.

11. The combination of claim 9, wherein said at least two stakes and said additional stake are driven to the ground at an acute angle to prevent the blow molded figure from being blown away by wind.

12. The combination of claim 11, wherein said first bend is not greater than 45° and said second bend is not greater than about 20°.

13. A combination comprising a blow molded figure having an inwardly extending flange at a base thereof and a staking system for the blow molded figure, said staking system including at least two stakes each having a first elongated portion terminating in a first bend of not greater than about 45° leading to a second portion and an upper portion connected to the second portion, said upper portion extends over and above the second portion for retaining the base of the blow molded figure, said first and second portions being coplanar, and at least one additional stake having an engagement portion at one end thereof for contacting the outside of said blow molded figure, whereby said at least two stakes driven into the ground have the second portions thereof in contact with the flange on the blow molded figure and said additional stake has the engagement portion thereof in contact with the blow molded figure to provide at least three angularly separated points of contact between the blow molded figure and said stakes.

14. The combination of claim 13, wherein said at least two stakes each have the second portion thereof terminating in a second bend leading to a third portion which defines said upper portion.

15. The combination of claim 14, wherein said second bend is not greater than about 20°.

16. The combination claim 15, wherein said second portion is positioned between the ground and said flange and the third portion overlies said flange, said additional stake extends through an aperture in said blow molded figure.

17. The combination of claim 16, wherein said at least two stakes and said additional stake are driven to the ground at an acute angle to prevent said blow molded figure from being blown away by wind.

\* \* \* \* \*